United States Patent
Bellar et al.

(10) Patent No.: US 11,928,608 B2
(45) Date of Patent: Mar. 12, 2024

(54) FLEXIBLE AUTOMATED SORTING AND TRANSPORT ARRANGEMENT (FAST) ASSET MONITOR

(71) Applicant: Walmart Apollo, LLC, Bentonville, AR (US)

(72) Inventors: Jason Bellar, Bella Vista, AR (US); William Mark Propes, Bentonville, AR (US); Chris Ford, Rogers, AR (US); Matthew D. Alexander, Rogers, AR (US); Amy Savaiinaea, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 18/077,458

(22) Filed: Dec. 8, 2022

(65) Prior Publication Data
US 2023/0103429 A1    Apr. 6, 2023

Related U.S. Application Data

(63) Continuation of application No. 16/790,840, filed on Feb. 14, 2020, now abandoned.
(Continued)

(51) Int. Cl.
*G06N 5/04*      (2023.01)
*G05D 1/00*      (2006.01)
(Continued)

(52) U.S. Cl.
CPC ............ *G06N 5/04* (2013.01); *G05D 1/0088* (2013.01); *G06N 20/00* (2019.01); *H04L 67/12* (2013.01);
(Continued)

(58) Field of Classification Search
CPC ........ G06N 5/04; G06N 20/00; G05D 1/0088; G05D 2201/0213; G05D 2201/0216; H04L 67/12; G06Q 10/0637; H04W 4/38
See application file for complete search history.

(56) References Cited

U.S. PATENT DOCUMENTS 7,385,529 B2    6/2008    Hersh et al.
7,672,855 B2    3/2010    Peterkofsky et al.
(Continued)

OTHER PUBLICATIONS

Thomas, Shane, "International Search Report", International Application No. PCT/US2020/018230, dated May 26, 2020, 2 pages.
(Continued)

*Primary Examiner* — Javier O Guzman
(74) *Attorney, Agent, or Firm* — Foley IP Law, PLLC

(57) ABSTRACT

A disclosed system for transport asset monitoring, for example monitoring truck trailer unloading progress at large retail locations, includes an artificial intelligence (AI) solution for managing operations at a facility. The AI solution analyzes current load percentage and other data to predict availability for moving the transport asset and ability to accept a new incoming transport asset. Predictions of availability can reduce response times, resulting in higher utilization rates for assets, thereby improving efficiency. An exemplary system includes a sensor configured to sense operation progress parameter data for a transport asset; and logic to receive the operation progress parameter data from the sensor; determine, using the AI solution and based at least on the operation progress parameter data, a predicted milestone parameter; and report the predicted milestone parameter to a remote node.

20 Claims, 5 Drawing Sheets

Related U.S. Application Data

(60) Provisional application No. 62/811,187, filed on Feb. 27, 2019.

(51) Int. Cl.
*G06N 20/00* (2019.01)
*H04L 67/12* (2022.01)

(52) U.S. Cl.
CPC .............. *G05D 2201/0213* (2013.01); *G05D 2201/0216* (2013.01)

(56) References Cited

U.S. PATENT DOCUMENTS

| | | | |
|---|---|---|---|
| 8,682,808 B2 | 3/2014 | Ding et al. | |
| 9,950,877 B2 | 4/2018 | Thompson et al. | |
| 9,953,332 B2 | 4/2018 | Bateman | |
| 10,163,070 B1* | 12/2018 | Phillips | G06Q 10/0834 |
| 10,504,366 B1* | 12/2019 | Dagley | G08G 1/144 |
| 2003/0126103 A1* | 7/2003 | Chen | G06Q 10/08 |
| | | | 706/50 |
| 2008/0077464 A1 | 3/2008 | Gottlieb et al. | |
| 2010/0169000 A1* | 7/2010 | Overgoor | G01C 21/34 |
| | | | 701/465 |
| 2010/0256836 A1 | 10/2010 | Mudalige | |
| 2014/0279669 A1* | 9/2014 | Bruns | G06Q 10/0631 |
| | | | 705/341 |
| 2016/0075341 A1 | 3/2016 | Arvidsson et al. | |
| 2016/0202074 A1* | 7/2016 | Woodard | G06Q 10/047 |
| | | | 701/465 |
| 2016/0379168 A1 | 12/2016 | Foerster et al. | |
| 2017/0147976 A1* | 5/2017 | Koch | G06Q 10/0833 |
| 2017/0154347 A1* | 6/2017 | Bateman | G06Q 40/08 |
| 2017/0308850 A1 | 10/2017 | Roush et al. | |
| 2018/0200761 A1* | 7/2018 | Putcha | B65G 67/08 |
| 2019/0066041 A1* | 2/2019 | Hance | G01C 21/3407 |
| 2019/0228855 A1 | 7/2019 | Leifer et al. | |
| 2019/0258978 A1* | 8/2019 | Mahajan | G06Q 10/06315 |

OTHER PUBLICATIONS

Thomas, Shane, "Written Opinion", International Application No. PCT/US2020/018230, dated May 26, 2020, 4 pages.

* cited by examiner

FLEXIBLE AUTOMATED SORTING AND TRANSPORT ARRANGEMENT (FAST) ASSET MONITOR

CROSS REFERENCE OF RELATED APPLICATIONS

This application is a continuation of U.S. patent application Ser. No. 16/790,840, filed Feb. 14, 2020, entitled "FLEXIBLE AUTOMATED SORTING AND TRANSPORT ARRANGEMENT (FAST) ASSET MONITOR", which claims the benefit of priority of U.S. Provisional Application No. 62/811,187, filed Feb. 27, 2019, entitled "FLEXIBLE AUTOMATED SORTING AND TRANSPORT ARRANGEMENT (FAST) ASSET MONITOR", each of which is incorporated herein in its entirety.

BACKGROUND

In large retail settings, the delivery, unloading, and sorting of items can be a significant aspect of operational efficiency. Under-utilization of assets, caused by delays, faulty planning assumptions, and resource limitations, can degrade efficiency and negatively impact profitability. In some conventional asset monitoring approaches, delivery assets (e.g., truck trailers) are monitored during transit and for arrival at destinations, and then visibility into activities affecting the asset's return to service abruptly cease.

SUMMARY

A disclosed system for transport asset monitoring, for example monitoring truck trailer unloading progress at large retail locations, includes an artificial intelligence (AI) solution for managing operations at a facility. The AI solution analyzes current load percentage and other data to predict availability for moving the transport asset and ability to accept a new incoming transport asset. Predictions of availability can reduce response times, resulting in higher utilization rates for assets, thereby improving efficiency. An exemplary system includes a sensor configured to sense operation progress parameter data for a transport asset; and logic to receive the operation progress parameter data from the sensor; determine, using the AI solution and based at least on the operation progress parameter data, a predicted milestone parameter; and report the predicted milestone parameter to a remote node.

BRIEF DESCRIPTION OF THE DRAWINGS

The disclosed examples are described in detail below with reference to the accompanying drawing figures listed below.

Figure 1:
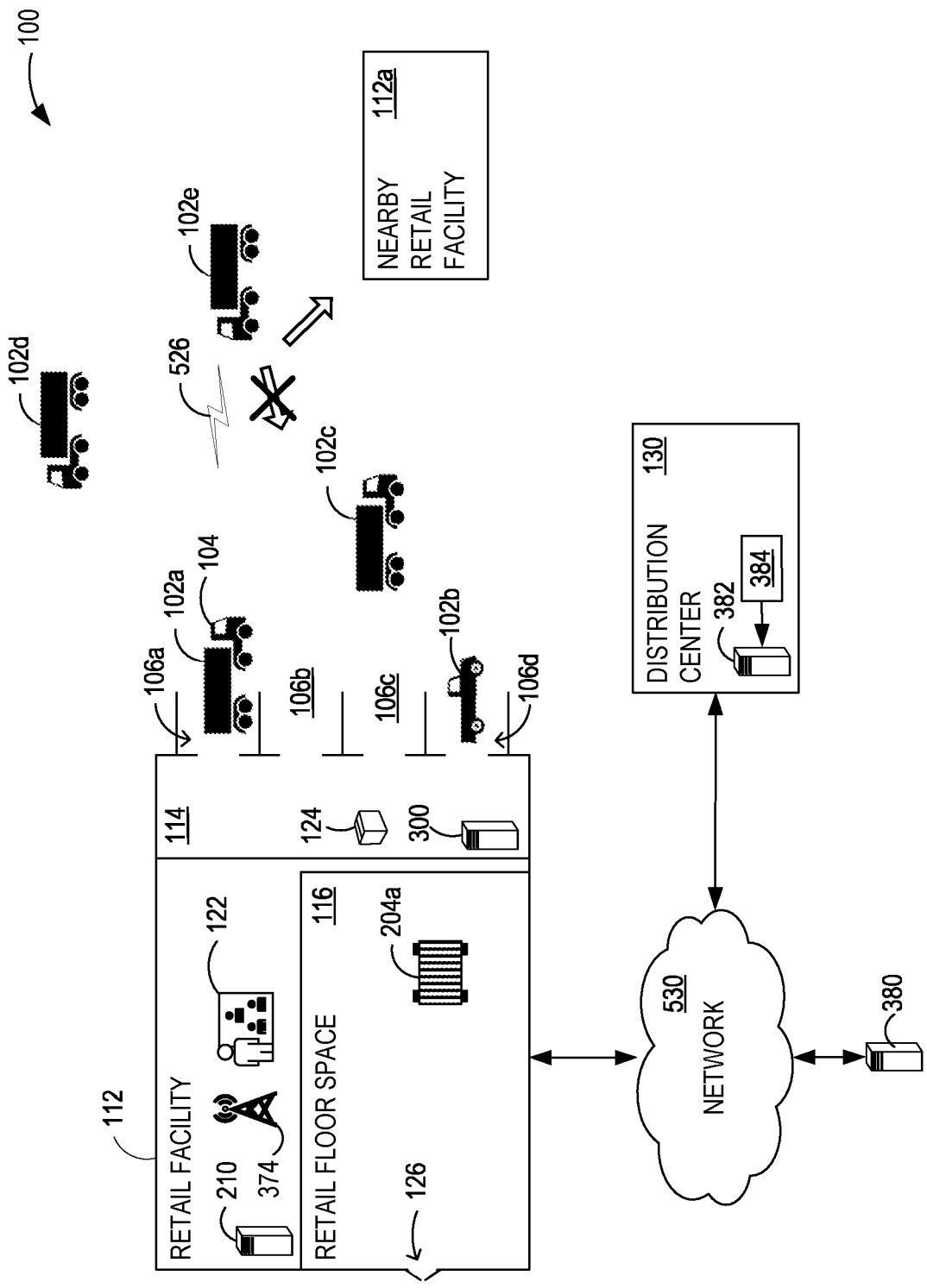
FIG. 1 illustrates an exemplary arrangement for transport asset monitoring.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum.

In large retail settings, the delivery, unloading, and sorting of items can be a significant aspect of operational efficiency. Under-utilization of assets, caused by delays, faulty planning assumptions, and resource limitations, can degrade efficiency and negatively impact profitability. In some conventional asset monitoring approaches, delivery assets (e.g., truck trailers) are monitored during transit and for arrival at destinations, and then visibility into activities affecting the asset's return to service abruptly cease.

Therefore, a disclosed system for transport asset monitoring, for example monitoring truck trailer unloading progress at large retail locations, includes an artificial intelligence (AI) solution for managing operations at a facility. The AI solution analyzes current load percentage and other data to predict availability for moving the transport asset and ability to accept a new incoming transport asset. Predictions of availability can reduce response times, resulting in higher utilization rates for assets, thereby improving efficiency. An exemplary system includes a sensor configured to sense operation progress parameter data for a transport asset; and logic to receive the operation progress parameter data from the sensor; determine, using the AI solution and based at least on the operation progress parameter data, a predicted milestone parameter; and report the predicted milestone parameter to a remote node.

In some examples, the AI solution manages trailer operations at a retail facility. Some example AI solutions analyze trailer current unloading progress, remaining load, trailer route, driver log, driver instructions. This permits predicting when the trailer can move, and thus, some examples also determine driver availability to transport the trailer, so that driver availability and trailer availability can be coordinated. Additional efficiency is achieved when multi-stop trailers are routed to another destination when the retail facility will not be ready for the arrival at the expected time. Also, in some examples, when trailer unloading is finished, additional activity can be coordinated, for example stowing a modular conveyor assembly, such as the mechanized portions of a flexible automated sorting and transport arrangement (FAST). Some examples also instruct loaders to load return or transfer items on a trailer, or empty pallets or breakpack cartons.

The result is enhanced efficiency, from leveraging automation to coordinate services and activities. By informing remote nodes of progress, activity schedules for dispersed assets can be more tightly integrated. Information is shared with incoming trucks and a driver logistics system to pair drivers (who are in the vicinity and have a budget of driving time remaining) with trailers, being able to schedule the trailer departure in advance. A driver management rules assists locating a driver to transport a completed trailer to its next destination.

FIG. 1 illustrates an exemplary arrangement 100 for transport asset monitoring. Arrangement 100 includes several transport assets 102a-102e. In general, a transport asset may include a trailer, a box truck, a flatbed truck, a pickup truck, an automated ground vehicle (AGV), a railway vehicle, an aerial vehicle, or any other motorized or towed conveyance. For example, transport asset 102a is a trailer connected to a tractor 104. As illustrated, a retail facility 112 has an unloading bay 114 with several dock positions 106a-106d. Transport asset 102a is occupying dock position 106a and transport asset 102b is occupying dock position 106d. Dock positions 106b and 106c are unoccupied.

Also as illustrated, transport asset 102c is departing retail facility 112, navigating toward either a distribution center 130 to retrieve another load, or if transport asset 102c is on a multi-stop route, transport asset 102c is navigating toward a nearby retail facility 112a. Transport asset 102d is inbound to retail facility 112 and will occupy one of dock positions 106b and 106c upon arrival. Although there are two available dock positions (106b and 106c) the advantageous operations of the teachings herein have predicted that unloading operations will be inefficient if transport asset 102e arrives as expected. Such a determination can be made, as described below, using information related to current operation progress parameter data (e.g., unloading status) for transport assets 102a and 102b, labor force profile (e.g., absences, workers available), equipment status (e.g., mechanized equipment failures and downtime), and other information. Therefore, despite the predicted availability of at least one of dock positions 106b and 106c, transport asset 102e is diverted to a different destination. For example, transport asset 102e may be diverted to nearby retail facility 112a using a wireless communication link 526. Such efficiencies are achievable because transport assets 102a-102e report their position and other operation progress parameter data to a central hub 380, where it can be retrieved for advantageous use.

Within unloading bay 114, there is a backup of item (such as item 124) that are awaiting removal from unloading bay 114 for stocking on a retail floor space 116 or some other location within retail facility 112. In some examples, an AGV 204a is tasked with transporting item 124 from unloading bay 114 to retail floor space 116, such as delivering featured items on a pallet nearby a front door 126 of retail floor space 116. This, however, requires time. Due to prior experience, when all four dock positions 106b and 106c had been occupied simultaneously, with a labor force comparable to current labor force 122, the unloading operations were significantly slowed. As a result, a machine learning (ML) component (see FIG. 3) generated an AI solution (using historical operation progress parameter data) that diverted transport asset 102e.

AGV 204a is in communication with a wireless communication module 374, permitting it to share data with, and receive instructions from, FAST computing node 210 and/or a FAST asset monitor computing node 300. FAST computing node 210 is described in greater detail with respect to FIG. 2, and asset monitor computing node 300 is described in greater detail with respect to FIG. 3. In some examples, asset monitor computing node 300 is a stand-alone node; in some examples, asset monitor computing node 300 is integrated within FAST computing node 210.

Asset monitor computing node 300 predicts operational milestone parameters (e.g., percentage complete and expected completion time for an unloading operation) and reports one or more predicted milestone parameters to a remote node, for example central hub 380. FAST computing node 210 and Asset monitor computing node 300 communicate with central hub 380 over a network 530. In some examples, nearby retail facility 112a has the same set of assets as retail facility 112, and so also communicate with central hub 380 over network 530. A warehouse management system (WMS) 382, which includes a WMS asset monitor component 384 also communicates with central hub 380 over network 530. This permits WMS 382 to monitor predicted availability for transport assets 102a and 102b, providing lead time for scheduling use of transport assets 102a and 102b for future delivery tasks. More detail is provided for WMS 382 and WMS asset monitor component 384 in relation to FIG. 3.

Figure 2:
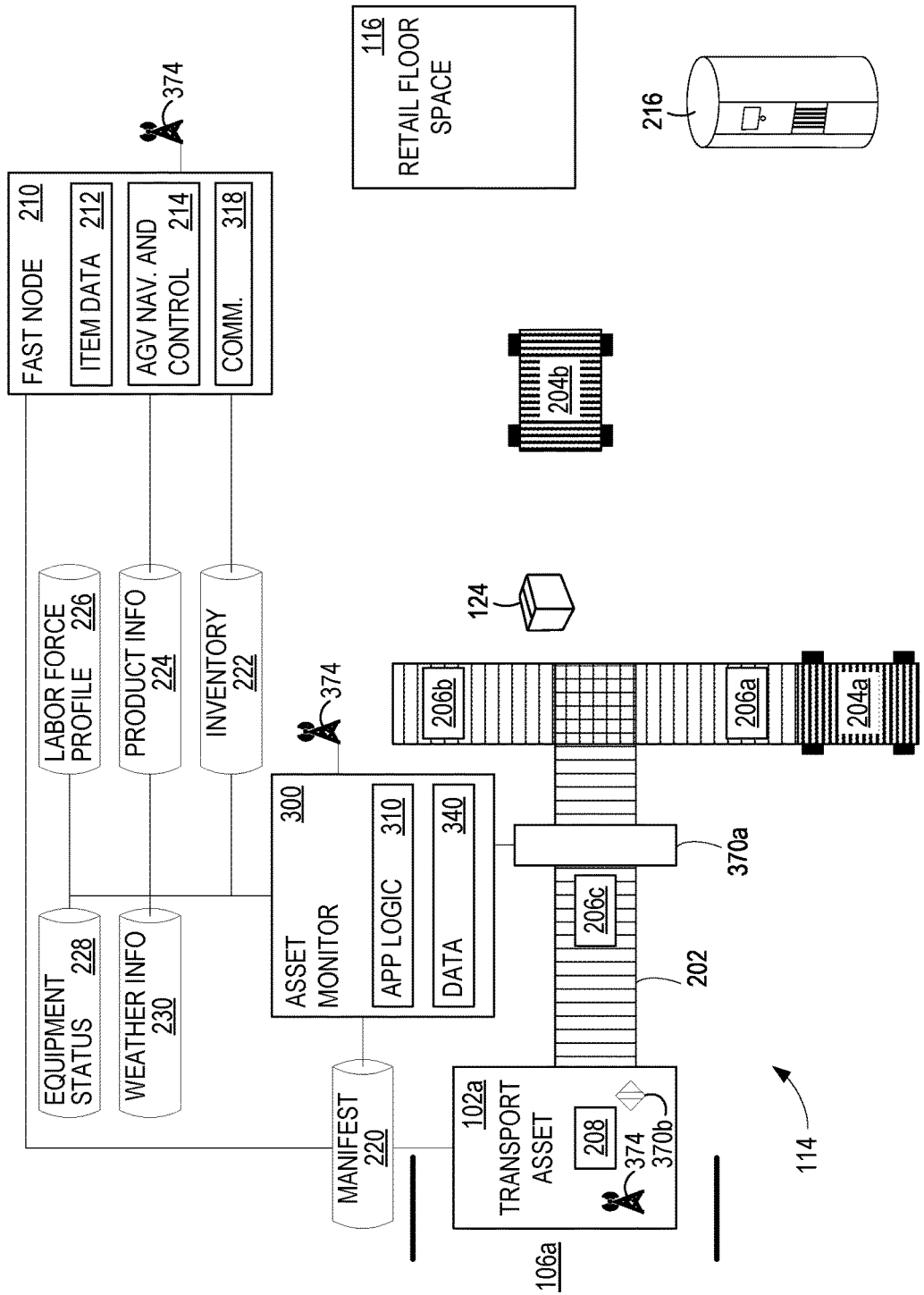
FIG. 2 illustrates a finer level of detail for some elements of the exemplary arrangement of FIG. 1.

FIG. 2 illustrates a finer level of detail for some elements of arrangement 100. A conveyor assembly 202 is used in unloading bay 114 for unloading operations for transport asset 102a in dock position 106a. In some examples, conveyor assembly 202 is a FAST modular conveyor assembly that can be disassembled and stowed when not in use. The disassembly operation requires a labor force, which can be beneficially scheduled in advance, if the completion time of the unloading operation can be predicted. As illustrated, items 206a, 206b, and 206c have been unloaded from transport asset 102a; item 208 remains on transport asset 102a.

A first sensor 370a, which can be any of an MD sensor, a barcode scanner, and a computer vision (CV) sensor, senses a first operation progress parameter data for transport asset 102a, specifically, identification of item 206c that is being unloaded from transport asset 102a. A second sensor 370b, which can be any sensor suitable for the task, senses a second operation progress parameter data for the transport asset, specifically, identification of item 208 remaining on transport asset 102a. Asset monitor computing node 300 receives the first operation progress parameter data from first sensor 370a and receives the second operation progress parameter data from second sensor 370b. As illustrated, transport asset has its own wireless communication module 374 for communicating data from second sensor 370b to asset monitor computing node 300.

Asset monitor computing node 300 uses application logic 310 and data 340 (described in more detail in relation to FIG. 3), to determine a predicted milestone parameter, for example the completion time of unloading transport asset 102a. For example, a cargo manifest 220, that lists items 206a-206c and 208 can be used, along with the identification of items 206a-206c (by sensor 370a) as having been unloaded, enables determination that item 208 remains on board. Alternatively, sensor 370b can, in some situations, preclude the need for calculating the remaining items, by sensing item 208 directly. In order to facilitate determining a predicted milestone parameter, asset monitor computing node 300 uses a variety of data sets. As illustrated, these include a retail facility inventory 222, product information 224, a labor force profile 226, equipment status 228, and weather information 230.

Product information 224 includes data regarding container sizes, weights, and other parameters that can affect delivery speed. Such information is relevant when, historically, delivery of products having certain characteristics slowed unloading operation speed for subsequent transport assets that arrived within a certain period of time. Labor force profile 226 can be used to determine whether there are sufficient labor assets available to unload additional expected incoming transport assets. If not, then incoming transport assets may be diverted, or their predicted departure availability will be delayed. Equipment status 228 indicates if unloading equipment, such as a forklift, is out of operation, and thus may cause unloading operation delays. Weather information 230 can be used when past inclement weather incidents are correlated with delayed operations. For example, snowstorms can affect labor asset availability and preclude use of some dock locations.

AGVs 204a and 204b are tasked by FAST computing node 210 or asset monitor computing node 300 with transporting items 124, 206a, 206c, 206c, and 208 from unloading bay 114 to retail floor space 116, automated storage and retrieval system (ASRS) 216, or another location. In some examples, asset monitor computing node 300 wirelessly communicates with AGVs 204a and 204b to provide logistical data related to the AGV. The logistical data can include item delivery prioritization, delivery instructions, and navigation instructions. For example, asset monitor computing node 300 may instruct AGV 204b to retrieve and deliver item 124 prior to retrieving and delivering item 206. As illustrated, FAST computing node 210 includes item data 212 that identifies delivery destinations for items 124, 206a, 206c, 206c, and 208, an AGV navigation and control component 214 for directing AGVs 204a and 204b, and a communication logic 318 for communicating with various remote nodes (e.g., central hub 380).

Figure 3:
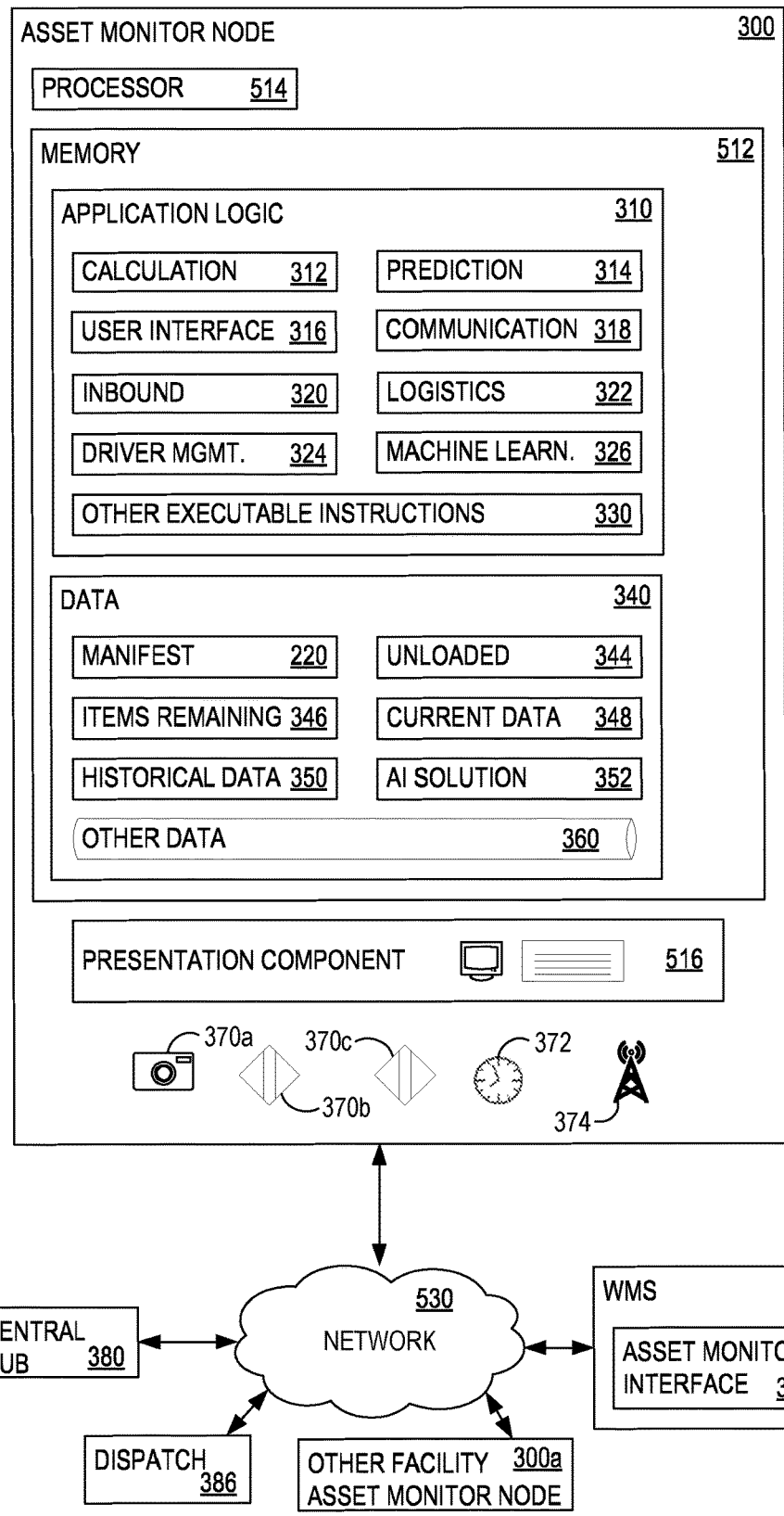
FIG. 3 illustrates a finer level of detail for some elements of the exemplary arrangement of FIG. 1.

FIG. 3 illustrates a finer level of detail for asset monitor computing node 300. Asset monitor computing node 300 includes a processor 514 that executes operations encoded as logic and stored in a memory 512. Memory is a non-transitory computer-readable medium storing data 340 and instructions (application logic 310) that are operative, when executed by processor 514, to perform operations described herein. Asset monitor computing node 300 receives operation progress parameter data from one or more of sensors 370a, 370b, and 370c, for example, via wireless communication module 374. In the illustrated example, sensor 370a is depicted as a CV sensor, although it should be understood that sensor 370a can be a different type of sensor, that any of sensors 370b and 370c can be a CV sensor, and also that a different number of sensors can be used.

Asset monitor computing node 300 calculates, using a calculation logic 312 the remaining load of a transport asset, using cargo manifest 220 and subtracting items unloaded 344, to determine items remaining 346. This provides a percentage complete. Using the scenario depicted in FIG. 2, items unloaded 344 lists items 206a-206c and items remaining 346 lists item 208. From this data, a prediction logic 314 uses AI solution 352 to determine, based at least on operation progress parameter data (e.g., one or more of items unloaded, items remaining, percentage complete), a predicted milestone parameter (e.g., expected completion time or departure-ready time). A timer 372 provides the elapsed time for reaching the current state of unloading percentage, and as a simple prediction example, if the unloading progress has reached 50% (halfway), the remaining time is equal to the elapsed time. However, such a simplified calculation does not leverage historical data 350, which may indicate that the second half of unloading operations were either faster or slower than the first half in most situations matching current data 348. Using AI solution 352 with operation progress parameter data and current data 348 permits a more reliable prediction. In some examples, AI solution 352 is a neural net that had been programmed by an ML component 326 using historical data 350.

Figure 5:
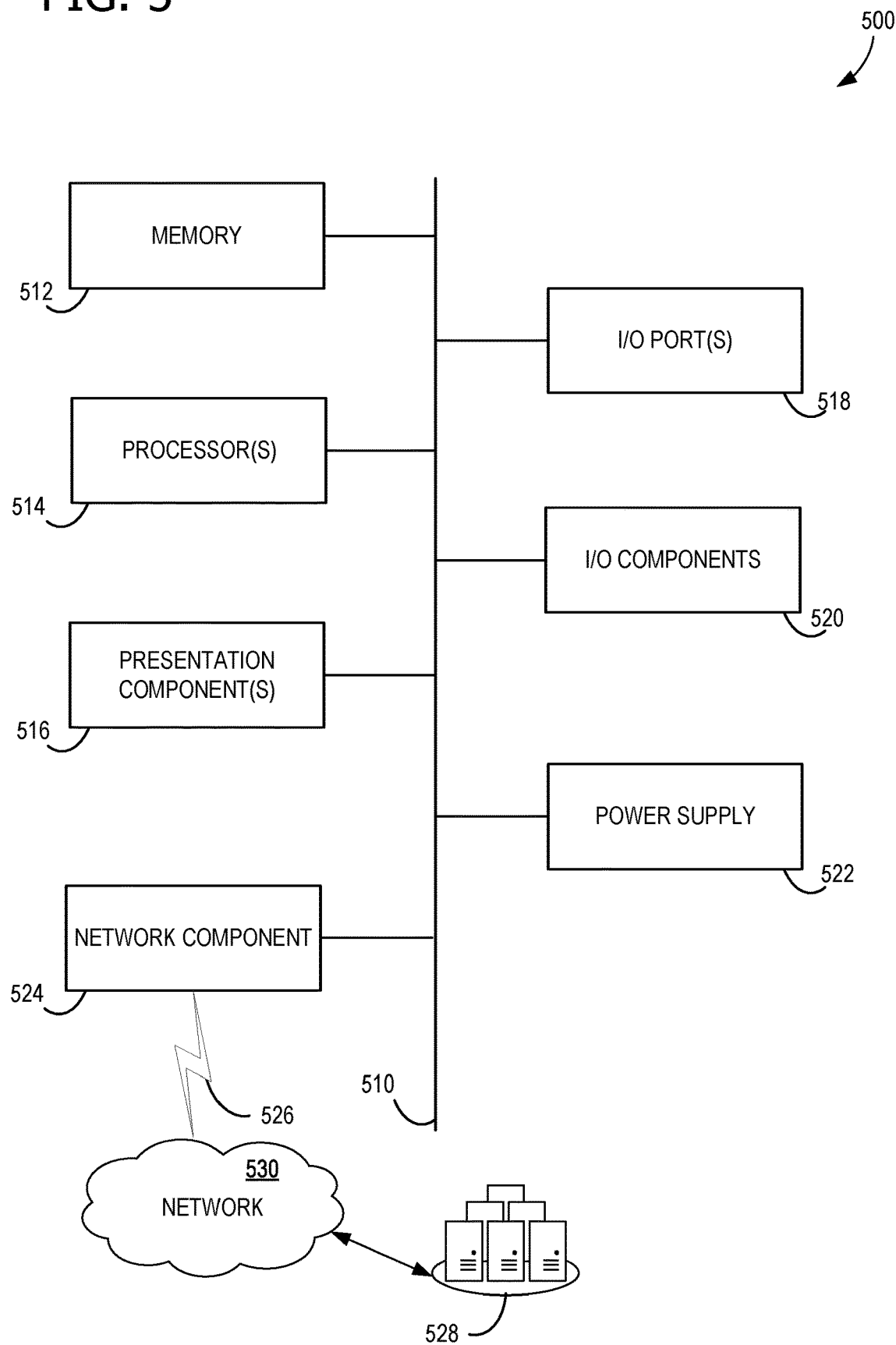
FIG. 5 is a block diagram of an example computing node for implementing aspects disclosed herein.

A user interface (UI) 316, permits a human to confirm or correct the predicted milestone parameter using a presentation component 516 (described in more detail with respect to FIG. 5). In some examples, the milestone parameter is departure-ready time, which can differ from unloading compete time. For example, in multi-stop situation, a transport asset is only partially unloaded. Also, if an empty transport asset is to be loaded with return items, prediction logic 314 may predict unloading complete time accurately, but may not factor in the reloading time. In such a situation, a human can over-ride estimate of the time that the transport asset will be ready to depart, using UI 316. In some examples, the progress (measured as completion percentage) is displayed on presentation component 516 as a bar graph, to provide workers in the vicinity of unloading bay 114 with a visual indication of progress. The barograph representing progress can also be displayed at central hub 380, WMS 382 (using WMS asset monitor component 384 within WMS 382 to communicate with asset monitor computing node 300), and/or a driver dispatch 386 that will be scheduling and sending a driver to retrieve the transport asset being unloaded.

Communication logic 318 uses network 530 to report the predicted milestone parameter to a remote node, for example central hub 380, driver dispatch 386, and/or WMS 382 (specifically, WMS asset monitor component 384 within WMS 382). An inbound asset management logic 320 determines whether to divert expected incoming transport assets. For example, AI solution 352 may predict that an inbound transport asset will not be unloaded efficiently and may therefor instruct a delay or diversion to provide a minimum arrival interval between transport assets, even when there is an empty dock position. Some of the factors that AI solution 352 operates on are the type of items in the current load and expected arriving load, labor force profile, weather, equipment status, and other factors. In some situations, for example a multi-stop route, a transport asset may be loaded such that changing an expected route is not practical because the item positions in the truck would require unloading and reloading to access the items out of the order that was expected when the transport asset had been loaded. Such determinations can leverage cargo manifest 220. A logistics logic 322 is operative to generate, using AI solution 352 and based at least on operation progress parameter data, logistical instructions for a transport asset. Logistics logic 322 can work with, or include, inbound asset management logic 320, although logistics logic 322 also includes planning for outbound transport assets.

A driver management logic 324 assists locating a driver to transport a completed trailer to its next destination for when the transport asset is ready to depart, in order to provide lead time. In some examples, driver management logic 324 and inbound asset management logic 320 are included within logistics logic 322. Driver management logic 324 helps avoid situations in which a transport asset sits in a dock position empty and unused, because efforts to locate a driver and tractor had not begun early enough. In some examples, driver management logic 324 include driver management rules such as:

- driver hours worked during the current cycle (e.g., current day);
- driver hours worked during recent cycles (e.g., current week);
- driver proximity;

return load priority;
driver wait time; and
predicted driver task completion time.

ML component 326 generates AI solution 352 using at least historical operation progress parameter data stored in historical data 350. AI solution 352 is then able to use current data 348 as input data. Current data 348 includes data obtained from sensors (e.g., sensors 370a, 370b, and 370c, which are configured to sense operation progress parameter data for a transport asset), and also a variety of data sets, including data available through FAST computing node 210. Examples of the data stored in current data 348 for use by AI solution 352 include (see FIG. 2): retail facility inventory 222, product information 224, labor force profile 226, equipment status 228, and weather information 230. Historical data 350 keeps records of past contents of current data 348, along with actual operational activity timing (determined at least partially using timer 372), so that AI solution 352 can be trained and improve with time.

Other executable instructions 330 and other data 360 include other logic and data that are useful in the operations disclosed herein. Other facility asset monitor node 300a may be a duplicate of asset monitor computing node 300, although located elsewhere (e.g., nearby retail facility 112a of FIG. 1). In some examples, other facility asset monitor node 300a share data with each other, central hub 380, and WMS 382 to permit fleet-wide operations planning, thereby enhancing efficiency in the utilization of transport assets.

Figure 4:
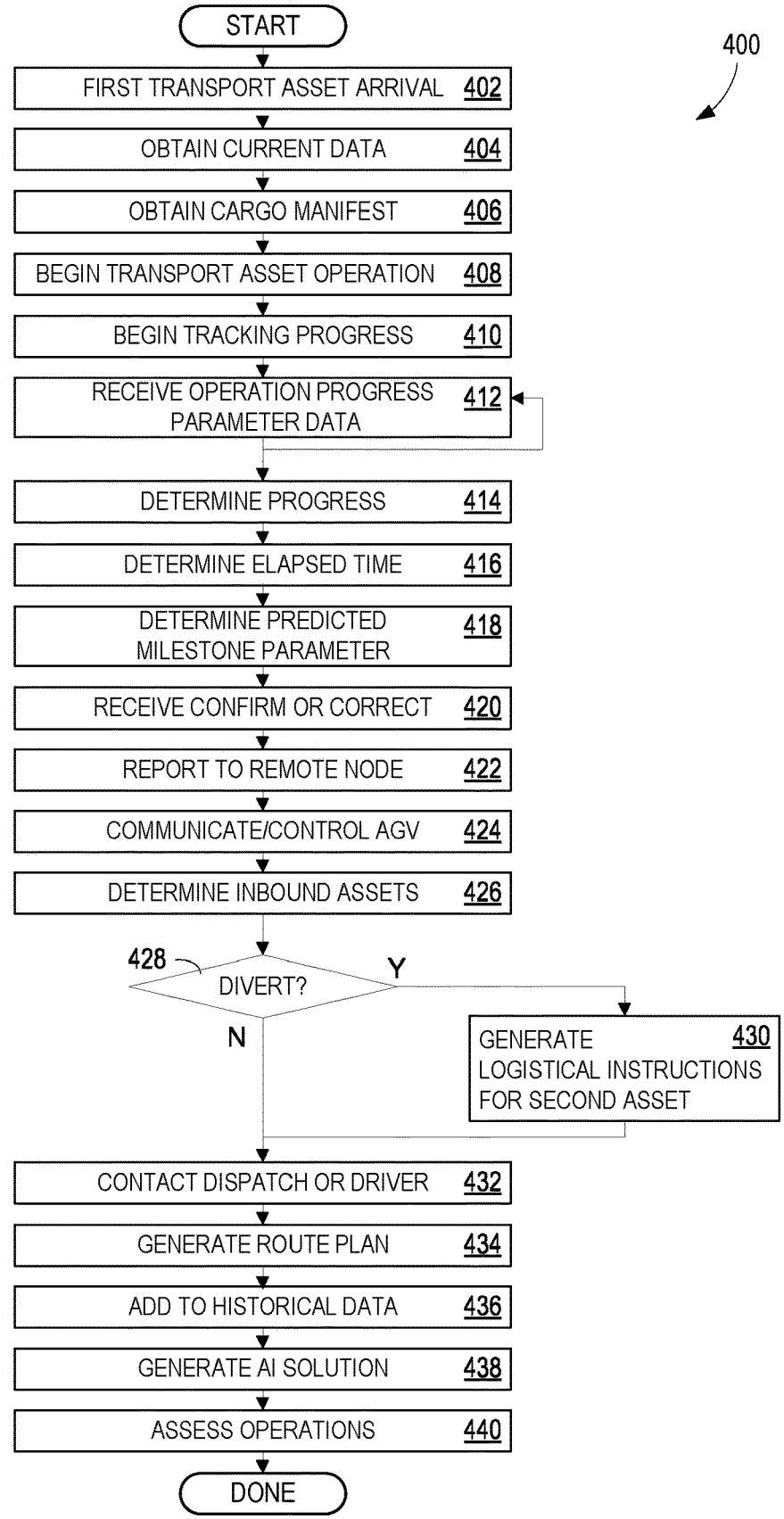
FIG. 4 shows a flow chart of operations associated with the exemplary arrangement of FIG. 1.

FIG. 4 shows a flow chart 400 of operations associated with arrangement 100. In some examples, some or all of flow chart 400 is performed as computer-executable instructions on a computing node 500 (see FIG. 5). Flow chart 400 commences when a first transport arrives in operation 402. Current data (e.g., current data 348) is obtained in operation 404, and the cargo manifest is obtained in operation 406. In some examples, FAST computing node 210 provides at least a portion of the data obtained in operations 404 and 406. In some examples, data is obtained both locally from retail facility 112 and remotely from central hub 380 and/or WMS 382.

Transport asset operations, such as unloading the first transport asset, begin in operation 408, and tracking of progress begins in operation 410. Operation 412 includes receiving a first operation progress parameter data for a first transport asset from a first sensor. In some examples, the first operation progress parameter data comprises identification of items unloaded from the transport asset. In some examples, receiving the first operation progress parameter data for the first transport asset comprises receiving the first operation progress parameter data for a trailer. In some examples, receiving the first operation progress parameter data from the first sensor data comprises receiving the first operation progress parameter data from at least one sensor selected from the list consisting of: an RFID sensor, a barcode scanner, and a CV sensor. As indicated in FIG. 4, operation 412 may repeat for additional sensor input. Some examples of repeating operation 412 include receiving a second operation progress parameter data from a second sensor, wherein the second operation progress parameter data comprises identification of items remaining on the transport asset.

Operation 414 includes determining progress, for example, determining or calculating the remaining load on a trailer, and calculating the percentage complete for the transport asset operation. The elapsed time is determined in operation 416. Operation 418 includes determining, using an artificial intelligence (AI) solution and based at least on the first operation progress parameter data, a predicted milestone parameter. In some examples, determining the predicted milestone parameter comprises determining, using the AI solution and based at least on the first operation progress parameter data and the second operation progress parameter data, the predicted milestone parameter. In some examples, determining the predicted milestone parameter comprises determining when the transport asset operation will be completed, and the transport asset will be ready to depart.

Operation 420 includes receiving, from a UI, confirmation or correction of the predicted milestone parameter. In some examples, UI 316 [provides logic and control and a human operator interfaces with UI 316 via presentation component 516. Thus, a human can verify or over-ride (correct) the prediction, based on conditions known to the human. For example, a new equipment malfunction may be known to the human, but not yet processed by AI solution 352. Operation 422 includes reporting the predicted milestone parameter to a remote node, for example central hub 380. In some examples, a completion (or ready-to-depart) prediction is pushed out via an application programming interface (API) to a messaging service. Operation 424 includes wirelessly communicating, with an AGV, logistical data related to the AGV. This includes prioritization instructions for item removal from unloading bay 114, and in some cases navigational instruction.

Operation 426 includes determining inbound transport assets, for example a second transport asset. Decision operation 428 includes determining, using the AI solution and based at least on the first operation progress parameter data, whether to divert the second transport asset, delay it, or provide any other logistical instructions. If yes, then operation 430 includes generating, using the AI solution and based at least on the first operation progress parameter data, logistical instructions for a second transport asset.

Operation 432 includes contacting or alerting drivers (e.g., via driver dispatch 386) so that a driver (and possibly also a needed tractor) will be available as soon as possible after the first transport asset is ready to depart. This reduces the time that the first transport asset occupies a dock position unnecessarily, relative to waiting until the transport asset is ready to depart before alerting a driver. Additionally, it can improve the utilization percentage of the transport asset. Operation 434 includes generating a route plan for the driver to use, for example returning the transport asset to a distribution center or sending it elsewhere for another task.

Operation 436 includes adding the current data and the recent historical operation progress parameter data (e.g., unloading progress, time to unload and predicted completion versus actual completion) to historical data, such as historical data 350. Operation 438 includes generating, with an ML component, the AI solution using at least historical operation progress parameter data (e.g., ML component 326 and AI solution 352). This includes improving a prior-existing AI solution. Operation 440 permits advantageous use of historical data by assessing operations. For example, chronic delays can be correlated with certain events and/or conditions. This information can be used to improve efficiency by informing decision-makers of issues to address, using quantifiable metric data.

Exemplary Operating Environment

FIG. 5 is a block diagram of an example computing node 500 for implementing aspects disclosed herein and is designated generally as computing node 500. Computing node 500 is one example of a suitable computing environment and is not intended to suggest any limitation as to the scope of use or functionality of the invention. Neither should the computing node 500 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through a communications network.

Computing node 500 includes a bus 510 that directly or indirectly couples the following devices: memory 512, one or more processors 514, one or more presentation components 516, input/output (I/O) ports 518, I/O components 520, a power supply 522, and a network component 524. Computing node 500 should not be interpreted as having any dependency or requirement related to any single component or combination of components illustrated therein. While computing node 500 is depicted as a seemingly single device, multiple computing nodes 500 may work together and share the depicted device resources. That is, one or more computer storage devices having computer-executable instructions stored thereon may perform operations disclosed herein. For example, memory 512 may be distributed across multiple devices, processor(s) 514 may provide housed on different devices, and so on.

Bus 510 represents what may be one or more busses (such as an address bus, data bus, or a combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 5 is merely illustrative of an exemplary computing node that can be used in connection with one or more embodiments. Distinction is not made between such categories as "workstation," "server," "laptop," "hand-held device," etc., as all are contemplated within the scope of FIG. 5 and the references herein to a "computing node" or a "computing device." Memory 512 may include any of the computer-readable media discussed herein. Memory 512 may be used to store and access instructions configured to carry out the various operations disclosed herein. In some examples, memory 512 includes computer storage media in the form of volatile and/or nonvolatile memory, removable or non-removable memory, data disks in virtual environments, or a combination thereof.

Processor(s) 514 may include any quantity of processing units that read data from various entities, such as memory 512 or I/O components 520. Specifically, processor(s) 514 are programmed to execute computer-executable instructions for implementing aspects of the disclosure. The instructions may be performed by the processor, by multiple processors within the computing node 500, or by a processor external to the client computing node 500. In some examples, the processor(s) 514 are programmed to execute instructions such as those illustrated in the flowcharts discussed below and depicted in the accompanying drawings. Moreover, in some examples, the processor(s) 514 represent an implementation of analog techniques to perform the operations described herein. For example, the operations may be performed by an analog client computing node 500 and/or a digital client computing node 500.

Presentation component(s) 516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 500, across a wired connection, or in other ways. Ports 518 allow computing node 500 to be logically coupled to other devices including I/O components 520, some of which may be built in. Example I/O components 520 include, for example but without limitation, a microphone, keyboard, mouse, joystick, game pad, satellite dish, scanner, printer, wireless device, etc.

In some examples, the network component 524 includes a network interface card and/or computer-executable instructions (e.g., a driver) for operating the network interface card. Communication between the computing node 500 and other devices may occur using any protocol or mechanism over any wired or wireless connection. In some examples, the network component 524 is operable to communicate data over public, private, or hybrid (public and private) using a transfer protocol, between devices wirelessly using short range communication technologies (e.g., near-field communication (NFC), Bluetooth® branded communications, or the like), or a combination thereof. Network component 524 communicates over communication link 526 to a cloud resource 528. Various different examples of communication link 526 include a wired connection, wireless connection, and/or a dedicated link, and in some examples, at least a portion is routed through the internet.

Although described in connection with an example computing node 500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for transport asset monitoring comprises: a first sensor configured to sense a first operation progress parameter data for a first transport asset; a processor; and a non-transitory computer-readable medium storing instructions that are operative when executed by the processor to: receive the first operation progress parameter data from the first sensor; determine, using an AI solution and based at least on the first operation progress parameter data, a predicted milestone parameter; and report the predicted milestone parameter to a remote node.

An exemplary method of transport asset monitoring comprises: receiving a first operation progress parameter data for a first transport asset from a first sensor, wherein receiving the first operation progress parameter data from the first sensor data comprises receiving the first operation progress parameter data from at least one sensor selected from the list consisting of: an RFID sensor, a barcode scanner, and a CV sensor; determining, using an AI solution and based at least on the first operation progress parameter data, a predicted milestone parameter; and reporting the predicted milestone parameter to a remote node.

One or more exemplary computer storage devices having computer-executable instructions stored thereon for transport asset monitoring, which, on execution by a computer, cause the computer to perform operations comprising: receiving a first operation progress parameter data for a first transport asset from a first sensor, wherein receiving the first operation progress parameter data for the first transport asset comprises receiving the first operation progress parameter data for a trailer, wherein the first operation progress parameter data comprises identification of items unloaded from the transport asset, and wherein receiving the first operation progress parameter data from the first sensor data comprises receiving the first operation progress parameter data from at least one sensor selected from the list consisting of: an RFID sensor, a barcode scanner, and a CV sensor; determining, using an AI solution and based at least on the first operation progress parameter data, a predicted milestone parameter; receiving, from a UI, confirmation or correction of the predicted milestone parameter; reporting the predicted milestone parameter to a remote node; generating, with an ML component, the AI solution using at least historical operation progress parameter data; and generating, using the AI solution and based at least on the first operation progress parameter data, logistical instructions for a second transport asset.

Alternatively, or in addition to the other examples described herein, examples include any combination of the following:

the transport asset comprises a trailer;

the first sensor comprises at least one sensor selected from the list consisting of: an RFID sensor, a barcode scanner, and a CV sensor;

the first operation progress parameter data comprises identification of items unloaded from the transport asset;

a second sensor configured to sense a second operation progress parameter data for the transport asset, wherein the second operation progress parameter data comprises identification of items remaining on the transport asset; and wherein the instructions are further operative to: receive the second operation progress parameter data from the second sensor; and wherein determining the predicted milestone parameter comprises determining, using the AI solution and based at least on the first operation progress parameter data and the second operation progress parameter data, the predicted milestone parameter;

the instructions are further operative to receive, from a UI, confirmation or correction of the predicted milestone parameter;

an ML component to generate the AI solution using at least historical operation progress parameter data;

a wireless communication module; and an AGV in communication with the processor via the wireless communication module;

the instructions are further operative to generate, using the AI solution and based at least on the first operation progress parameter data, logistical instructions for a second transport asset;

receiving the first operation progress parameter data for the first transport asset comprises receiving the first operation progress parameter data for a trailer;

the first operation progress parameter data comprises identification of items unloaded from the transport asset;

receiving a second operation progress parameter data from a second sensor, wherein the second operation progress parameter data comprises identification of items remaining on the transport asset; and wherein determining the predicted milestone parameter comprises determining, using the AI solution and based at least on the first operation progress parameter data and the second operation progress parameter data, the predicted milestone parameter;

receiving, from a UI, confirmation or correction of the predicted milestone parameter;

generating, with an ML component, the AI solution using at least historical operation progress parameter data;

wirelessly communicating, with an AGV, logistical data related to the AGV;

generating, using the AI solution and based at least on the first operation progress parameter data, logistical instructions for a second transport asset; and the predicted milestone parameter comprises an expected completion time of unloading the trailer.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for transport asset monitoring, the system comprising:
    a first sensor configured to sense a first unloading operation progress parameter data for a first transport asset at an unloading location, wherein the first transport asset is partially unloaded, wherein the first unloading operation progress parameter data comprises identification of items unloaded from the first transport asset;
    a processor; and
    a non-transitory computer-readable medium storing instructions that are operative when executed by the processor to:
    receive the first unloading operation progress parameter data from the first sensor;
    determine, based at least on the first unloading operation progress parameter data, a predicted milestone parameter, the milestone parameter comprising a determination of an expected completion time of unloading at least one item remaining on the first transport asset and a determination of an expected departure-ready time when the first transport asset is expected to be ready to depart, based on current data and historical data, the current data comprising at least one of the first unloading operation progress parameter data received from the first sensor or a data set, and the historical data comprising at least one of a record of past contents of the current data or actual operational activity timing; and
    report the predicted milestone parameter to a remote node to integrate activity schedules for the first transport asset and at least one other transport asset, wherein integrating activity schedules further comprises scheduling acceptance of a second incoming transport asset to the unloading location based on the expected completion time for the first transport asset.

2. The system of claim 1 wherein the first transport asset comprises a trailer, and wherein integrating the activity schedules further comprises:
    sending a driver to retrieve the first transport asset being unloaded at the expected completion time.

3. The system of claim 1 wherein the first sensor comprises at least one sensor selected from a list consisting of:
    an RFID sensor, a barcode scanner, and a computer vision (CV) sensor.

4. The system of claim 1 wherein integrating the activity schedules further comprises:
    diverting a third incoming transport asset from the unloading location to a different destination.

5. The system of claim 1 further comprising:
    a second sensor configured to sense a second operation progress parameter data for the first transport asset, wherein the second operation progress parameter data comprises an identification of items remaining on the first transport asset; and
    wherein the instructions are further operative to:
    receive the second operation progress parameter data from the second sensor;
    monitor the asset unloading progress at a determined location;
    and
    wherein determining the predicted milestone parameter comprises determining, based at least on the first unloading operation progress parameter data and the second operation progress parameter data, the predicted milestone parameter.

6. The system of claim 1 wherein the instructions are further operative to:
    receive, from a user interface (UI), confirmation or correction of the predicted milestone parameter.

7. The system of claim 1 further comprising:
    a machine learning (ML) component that generates an AI solution using at least historical operation progress parameter data.

8. The system of claim 1 further comprising:
a wireless communication module; and
an automated ground vehicle (AGV) in communication with the processor via the wireless communication module.

9. The system of claim 1 wherein the instructions are further operative to:
generate, based at least on the first unloading operation progress parameter data, logistical instructions for the second incoming transport asset to delay the second incoming transport asset to the same unloading location to provide a minimal arrival interval.

10. A method of transport asset monitoring, the method comprising:
receiving a first operation progress parameter data for a first transport asset from a first sensor, wherein receiving the first operation progress parameter data from the first sensor comprises receiving the first operation progress parameter data from at least one sensor selected from a list consisting of: an RFID sensor, a barcode scanner, and a computer vision (CV) sensor;
determining, based at least on the first operation progress parameter data, a predicted milestone parameter, the milestone parameter comprising a determination of an expected completion time of unloading at least one item remaining on the first transport asset and a determination of an expected departure-ready time when the first transport asset is expected to be ready to depart, based on current data and historical data, the current data comprising at least one of the first operation progress parameter data received from the first sensor or a data set, and the historical data comprising at least one of a record of past contents of the current data or actual operational activity timing; and
reporting the predicted milestone parameter to a remote node to integrate activity schedules for the first transport asset and at least one other transport asset.

11. The method of claim 10 wherein receiving the first operation progress parameter data for the first transport asset comprises receiving the first operation progress parameter data for a trailer.

12. The method of claim 10 wherein the first operation progress parameter data comprises an identification of items unloaded from the first transport asset.

13. The method of claim 10 further comprising:
receiving a second operation progress parameter data from a second sensor, wherein the second operation progress parameter data comprises an identification of items remaining on the first transport asset; and
wherein determining the predicted milestone parameter comprises determining, based at least on the first operation progress parameter data and the second operation progress parameter data, the predicted milestone parameter.

14. The method of claim 10 further comprising:
receiving, from a user interface (UI), confirmation or correction of the predicted milestone parameter.

15. The method of claim 10 further comprising:
generating, with a machine learning (ML) component, an AI solution using at least historical operation progress parameter data.

16. The method of claim 10 further comprising:
wirelessly communicating, with an automated ground vehicle (AGV), logistical data related to the AGV.

17. The method of claim 10 further comprising:
generating based at least on the first operation progress parameter data, logistical instructions for a second transport asset.

18. One or more computer storage devices having computer-executable instructions stored thereon for transport asset monitoring, which, on execution by a computer, cause the computer to perform operations comprising:
receiving a first operation progress parameter data for a first transport asset from a first sensor, wherein receiving the first operation progress parameter data for the first transport asset comprises receiving the first operation progress parameter data for a trailer, wherein the first operation progress parameter data comprises an identification of items unloaded from the first transport asset, and wherein receiving the first operation progress parameter data from the first sensor comprises receiving the first operation progress parameter data from at least one sensor selected from a list consisting of: an RFID sensor, a barcode scanner, and a computer vision (CV) sensor;
determining, based at least on the first operation progress parameter data, a predicted milestone parameter, the milestone parameter comprising a determination of an expected completion time when a first operation is expected to be completed and an expected departure-ready time when the first transport asset is expected to be ready to depart, based on current data and historical data, the current data comprising at least one of the first operation progress parameter data received from the first sensor or a data set, and the historical data comprising at least one of a record of past contents of the current data or actual operational activity timing;
receiving, from a user interface (UI), confirmation or correction of the predicted milestone parameter;
reporting the predicted milestone parameter to a remote node to integrate activity schedules for the first transport asset and at least one other transport asset;
generating, with a machine learning (ML) component, a solution using historical operation progress parameter data; and
generating, using the solution and based at least on the first operation progress parameter data, logistical instructions for a second transport asset based on the expected completion time for the first transport asset.

19. The one or more computer storage devices of claim 18 wherein the operations further comprise:
receiving a second operation progress parameter data from a second sensor, wherein the second operation progress parameter data comprises an identification of items remaining on the first transport asset, wherein determining the predicted milestone parameter comprises determining, based at least on the first operation progress parameter data and the second operation progress parameter data, the predicted milestone parameter.

20. The one or more computer storage devices of claim 18 wherein the predicted milestone parameter comprises an expected completion time of unloading the trailer.

* * * * *

UNITED STATES PATENT AND TRADEMARK OFFICE
CERTIFICATE OF CORRECTION

PATENT NO. : 11,928,608 B2
APPLICATION NO. : 18/077458
DATED : March 12, 2024
INVENTOR(S) : Bellar et al.

It is certified that error appears in the above-identified patent and that said Letters Patent is hereby corrected as shown below:

In the Specification

Column 4, Line 33 "MD" should be "RFID".

Signed and Sealed this
Sixteenth Day of April, 2024

Katherine Kelly Vidal
*Director of the United States Patent and Trademark Office*